(12) United States Patent
Fu

(10) Patent No.: US 10,940,778 B2
(45) Date of Patent: Mar. 9, 2021

(54) HEADREST HEIGHT ADJUSTMENT MECHANISMS FOR CHILD SAFETY SEATS

(71) Applicant: Ningbo Yuanyuan Auto Accessories Co., Ltd., Cixi (CN)

(72) Inventor: Xijiong Fu, Cixi (CN)

(73) Assignee: Ningbo Yuanyuan Auto Accessories Co., Ltd., Cixi (CN)

( * ) Notice: Subject to any disclaimer, the term of this patent is extended or adjusted under 35 U.S.C. 154(b) by 0 days.

(21) Appl. No.: 16/657,547

(22) Filed: Oct. 18, 2019

(65) Prior Publication Data
US 2020/0398711 A1 Dec. 24, 2020

(30) Foreign Application Priority Data

Jun. 21, 2019 (CN) .......................... 20190937609.X

(51) Int. Cl.
*B60N 2/28* (2006.01)
*B60N 2/824* (2018.01)

(52) U.S. Cl.
CPC ........... *B60N 2/2851* (2013.01); *B60N 2/824* (2018.02)

(58) Field of Classification Search
CPC ........ B60N 2/28; B60N 2/2851; B60N 2/286; B60N 2/2887; B60N 2/2812; B60N 2/2821; B60N 2/2863; B60N 2/818; B60N 2/809
USPC ...................................................... 297/250.1
See application file for complete search history.

(56) References Cited

U.S. PATENT DOCUMENTS

| 9,016,782 | B2* | 4/2015 | Xu ..................... | B60N 2/2851 297/250.1 |
| 9,067,516 | B2* | 6/2015 | Hutchinson .......... | B60N 2/2851 |
| 10,807,506 | B2* | 10/2020 | Denbo ................. | B60N 2/2872 |
| 10,843,605 | B2* | 11/2020 | Johnson ............... | B60N 2/2872 |
| 2005/0225136 | A1* | 10/2005 | Horton ................. | B60N 2/815 297/250.1 |
| 2009/0212613 | A1* | 8/2009 | Freeman .............. | B60N 2/2851 297/250.1 |
| 2010/0264705 | A1* | 10/2010 | Karremans .......... | B60N 2/2812 297/250.1 |
| 2011/0062756 | A1* | 3/2011 | Campbell ............ | B60N 2/2812 297/250.1 |
| 2011/0309663 | A1* | 12/2011 | Brunick .............. | B60N 2/2851 297/250.1 |
| 2012/0153690 | A1* | 6/2012 | Gaudreau, Jr. ...... | B60N 2/2851 297/250.1 |
| 2012/0181829 | A1* | 7/2012 | Williams ............. | B60N 2/2806 297/250.1 |
| 2012/0313413 | A1* | 12/2012 | Hutchinson .......... | B60N 2/2812 297/250.1 |

(Continued)

*Primary Examiner* — Shin H Kim
(74) *Attorney, Agent, or Firm* — Wang Law Firm, Inc.

(57) ABSTRACT

The present invention discloses a headrest height adjustment mechanism for child safety seats, which comprises a backrest (1), a headrest (2) and an adjustment device (3); wherein the adjustment device comprises a limiting block (31), a spring (33), an adjustment bar (32) capable of sliding up and down inside the mounting chamber (21); the limiting block (31) has a blocking portion (311); the adjustment bar (32) has a driving portion (321); the spring (33) is disposed between the adjustment bar (32) and the headrest (2) and enables the adjustment bar (32) to have a trend to slide downward. Compared with the prior art, the headrest height adjustment mechanism for child safety seats is convenient for operation and has high reliability of locking and unlocking.

10 Claims, 7 Drawing Sheets

(56) References Cited

U.S. PATENT DOCUMENTS

| | | | | |
|---|---|---|---|---|
| 2013/0175835 A1* | 7/2013 | Fujita | ............ | B60N 2/60 297/219.12 |
| 2014/0049081 A1* | 2/2014 | Davis | ............ | B60N 2/26 297/256.11 |
| 2014/0252815 A1* | 9/2014 | Xu | ............ | B60N 2/2851 297/183.1 |
| 2015/0246629 A1* | 9/2015 | Bohm | ............ | B60N 2/815 297/256.15 |
| 2016/0114705 A1* | 4/2016 | Morgenstern | ........ | B60N 2/2866 297/183.2 |
| 2016/0114706 A1* | 4/2016 | Hutchinson | .......... | B60N 2/2821 297/256.13 |

* cited by examiner

HEADREST HEIGHT ADJUSTMENT MECHANISMS FOR CHILD SAFETY SEATS

RELATE APPLICATION

This application claims benefit to Chinese Patent Application for a headrest height adjustment mechanism for child safety seats, 201920937609.X, filed on Jun. 21, 2019. The specification of the application is incorporated here by this reference.

TECHNICAL FIELD OF THE INVENTION

The present invention relates to the technical field of car seats and in particular to a headrest height adjustment mechanism for child safety seats.

BACKGROUND OF THE INVENTION

To ensure the children's safety of taking cars, it is stipulated by legislation in many countries that there should be a car seat in a car. By placing a child in a seat by a car seat, the children's safety of taking cars is ensured. Usually, there are many adjustment mechanisms arranged on a children's car seat to adjust the car seat, in order to improve the comfort of the car seat. Considering that children grow taller with age, or in order to be applicable to children in different heights, a headrest adjuster is usually equipped in car seats, which facilitates the adjustment of the height of the headrest so that the car seats are applicable to children in different heights.

A Chinese Patent CN206141377U, entitled "HEADREST ADJUSTMENT MECHANISMS FOR CAR SEATS", disclosed a headrest adjustment mechanism for car seats. This mechanism comprises a backrest and a headrest. A first guiding groove is formed on the headrest in a longitudinal direction. Multiple limiting chambers are successively provided in the first guiding groove in the longitudinal direction. An adjustment device is connected to the backrest, and the adjustment device includes a connecting bar, a key, a limiting block, and an elastic suppressing member sleeved on the connecting bar. The connecting bar runs through the backrest and extends into the guiding groove, and the elastic suppressing member is resisted between the back of the backrest and the key. The limiting block can be fitted in a limiting chamber by elastically suppressing the key by the elastic suppressing member, and can get out of the limiting chamber by the drive of the key, by pressing the key down. This headrest adjustment mechanism for car seats can be enabled to work simply by manipulating the key. The operation of adjustment is quite simple, with high efficiency.

However, for such car seats, it is necessary to independently operate the key and the headrest, which cannot be done by a single hand. The operation is troublesome.

SUMMARY OF THE INVENTION

A first technical problem to be solved by the present invention is to provide, in view of the state in the prior art, a headrest height adjustment mechanism for child safety seats, which is convenient for operation.

A second technical problem to be solved by the present invention is to provide, in view of the state in the prior art, a headrest height adjustment mechanism for child safety seats, which can be operated by a single hand.

In order to solve the first technical problem, the headrest height adjustment mechanism for child safety seats, comprises a backrest with a first mounting groove; a headrest being engaged to the first mounting groove and being capable of sliding up and down along the first amounting groove; and an adjustment device for adjusting height of the headrest; wherein the headrest has a mounting chamber for receiving the adjustment device; the adjustment device comprises a limiting block rotatably disposed inside the mounting chamber, a spring, an adjustment bar capable of sliding up and down inside the mounting chamber; the limiting block has a blocking portion protruding outward; the headrest has a through hole for the blocking portion to pass through; multiple slots for receiving the blocking portion are formed on the backrest along a height direction of the backrest; the adjustment bar has a driving portion for rotating the limiting block; the spring is disposed between the adjustment bar and the headrest and enables the adjustment bar to have a trend to slide downward; under the elasticity of the spring, the driving portion of the adjustment bar drives the blocking portion to pass through the through hole and is inserted into one slot on the backrest, when the blocking portion is locked; and, under an external force, the driving portion of the adjustment bar can slide upward against the elasticity of the spring, and drive the blocking portion to leave away from the slot on the backrest, when the blocking portion is unlocked.

Preferably, the limiting block has a first guide slope extending outwardly, driving portion has a second guide slope extending outward from top to bottom, and the first guide slope is resisted against the second guide slope when the blocking portion is unlocked. The first guide slope of the driving portion gradually gets close to the second guide slope of the limiting block when the adjustment bar slides upward, thereby driving the limiting block to rotate until the first guide slope is resisted against the second guide slope.

Preferably, the limiting block has a stopper protruding opposite to the blocking portion, and the stopper is resisted against the driving portion when the blocking portion is locked. The driving portion gradually gets close to the stopper of the limiting block when the adjustment bar slides downward, thereby driving the limiting block to rotate until the blocking portion is inserted in a slot.

Preferably, the adjustment device further comprises a securing member connected in the headrest inside the mounting chamber, and the securing member has a sliding groove for positioning the adjustment bar which only can slide along the sliding groove. The securing member can avoid the separation of the adjustment bar, in which case it is unable to drive the limiting block.

Preferably, the spring is a compression spring, the adjustment bar has a second mounting groove for receiving the spring, a limiting column that protruding into the second mounting groove is formed on a bottom surface of the mounting chamber, one end of the spring is resisted against the wall of the second mounting groove and the other end of the spring is resisted against the limiting column. Of course, the spring can be a tension spring. One end of the tension spring is hung onto a top surface of the second mounting groove and the other end of the tension spring is hung onto the limiting column. Such a solution realizes the same purpose.

Preferably, an operating portion exposed out of the surface of the headrest is disposed on the top of the adjustment bar. It is thus convenient for a user to operate the adjustment bar.

Further, a gripping portion is disposed on the top of the headrest, and the gripping portion has a moving groove in which the operating portion slides up and down. The arrangement of the gripping portion facilitates the application of a force to the operating portion by the user and ensures the stability of action of the operating portion.

Still further, the operating portion has an operating groove for the fingers of a user to insert. With such an arrangement, by a single hand, the operating portion can be driven to move upward in the moving groove and the headrest can be driven to wholly move upward or downward. Thus, the second technical problem can be solved.

Preferably, a guide rib arranged along the height direction is disposed on the sidewall of the first mounting groove, and correspondingly, a guide groove, which is guided by the guide rib, is formed on the sidewall of the headrest. Thus, it is convenient for the user to quickly insert the headrest in the first mounting groove on the backrest and control the adjustment of height of the headrest in the first mounting groove.

Preferably, a guide hole is formed on the backrest along the height direction, and correspondingly, a guide member, which can be inserted in the guide hole, is connected to the bottom of the headrest. The guide-fitting between the guide member and the guide hole plays a role of limiting similarly to the guide rib and the guide groove, and also prevents the separation of the headrest from the backrest during the upward movement of the headrest.

Compared with the prior art, the present invention has the following advantages: by the arrangement of the adjustment device, the adjustment of height of the headrest on the backrest can be realized easily; the adjustment bar drives, due to the elasticity of the spring, the blocking portion of the limiting block by the driving portion to pass through the jack is inserted into a slot on the backrest so that the blocking portion is locked, and the adjustment bar can slide upward, due to an external force and against the elasticity of the spring, and drive the blocking portion of the limiting block by the driving portion to separate from the slot on the backrest so that the blocking portion is unlocked; and the headrest height adjustment mechanism for child safety seats is convenient for operation and has high reliability of locking and unlocking.

DETAILED DESCRIPTION OF THE INVENTION

Figure 1:
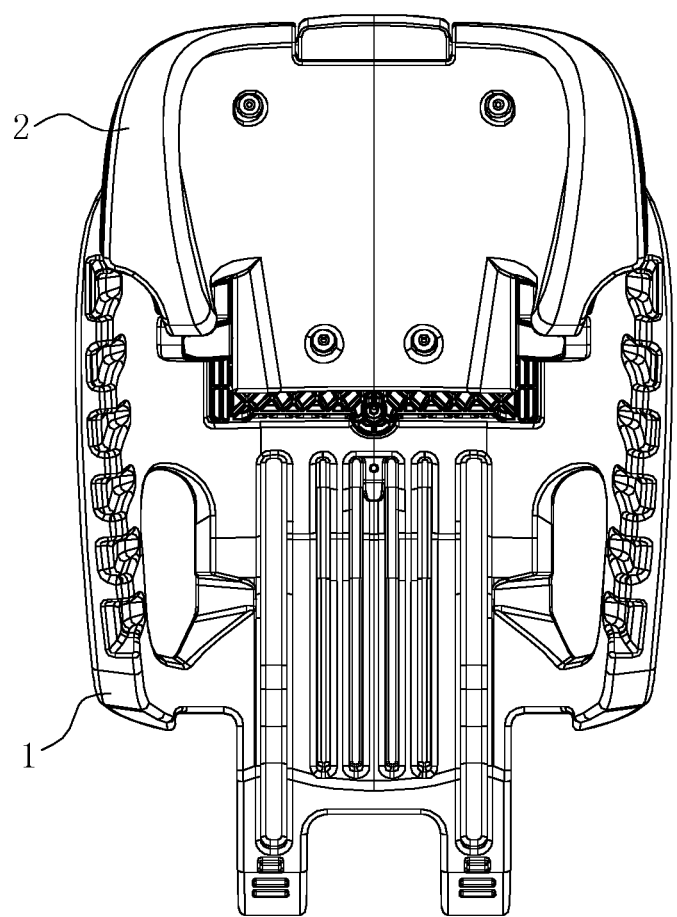
FIG. 1 is a perspective view of a headrest height adjustment mechanism for child safety seats according to an embodiment of the present invention, when the blocking portion is locked.
Figure 2:
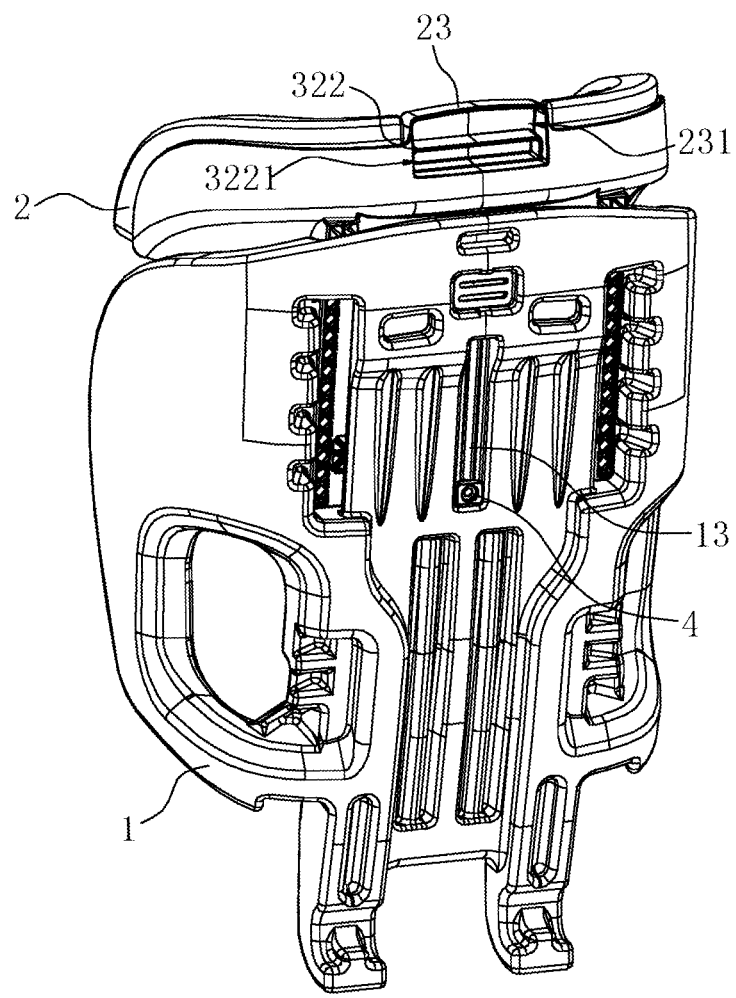
FIG. 2 is a perspective view of FIG. 1 from another direction.
Figure 3:
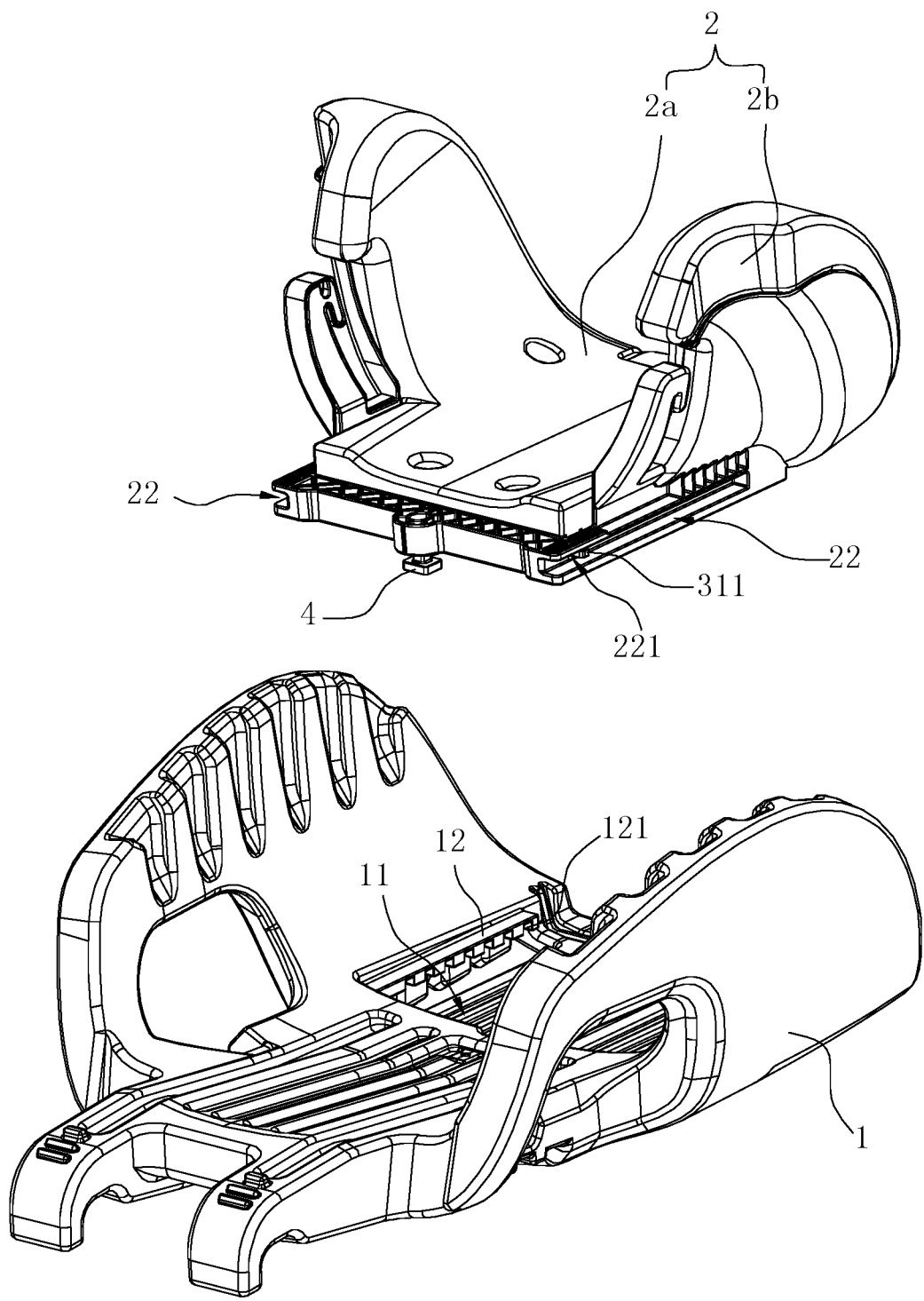
FIG. 3 is a perspective view of FIG. 1.
Figure 4:
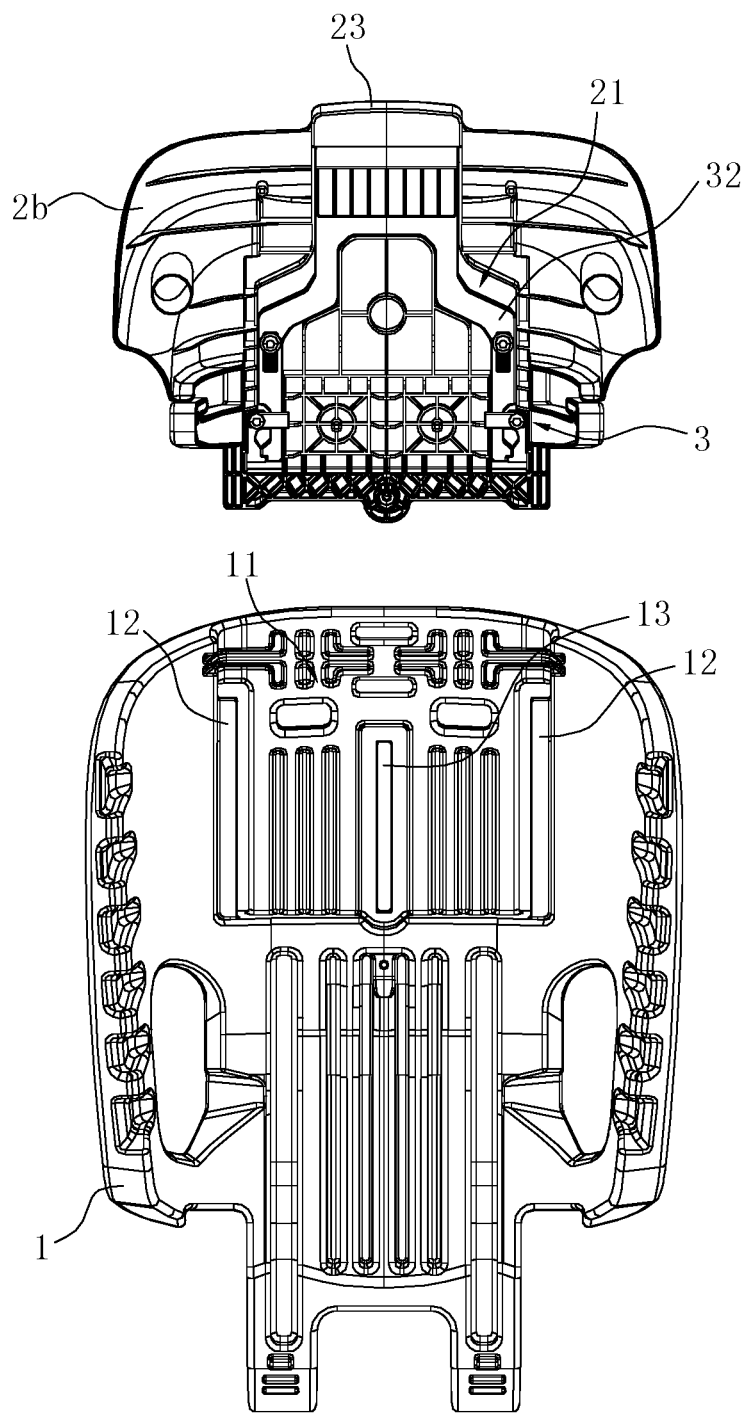
FIG. 4 is a perspective view of FIG. 1, when a front shell of the headrest is removed.
Figure 5:
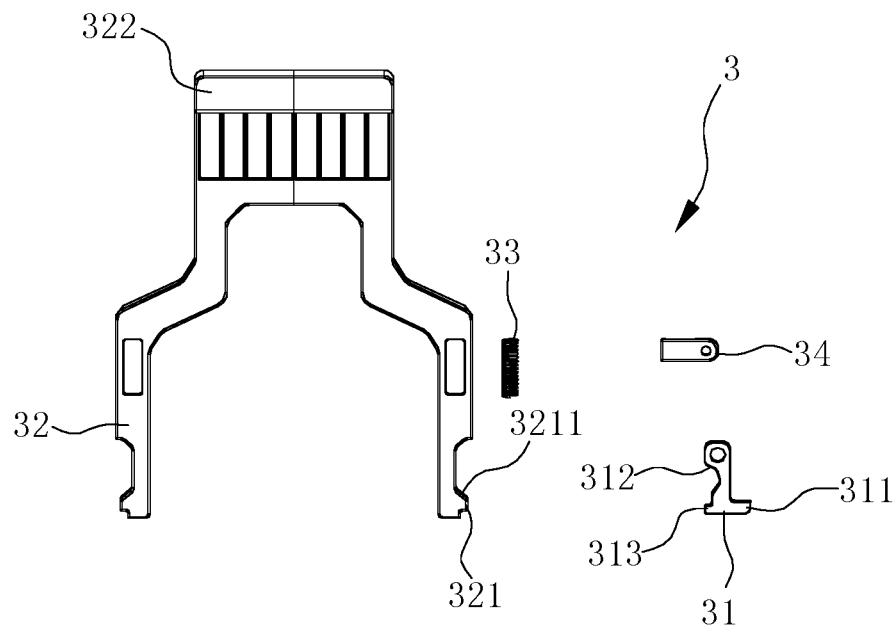
FIG. 5 is a perspective view of the adjustment device of FIG. 4.
Figure 6:
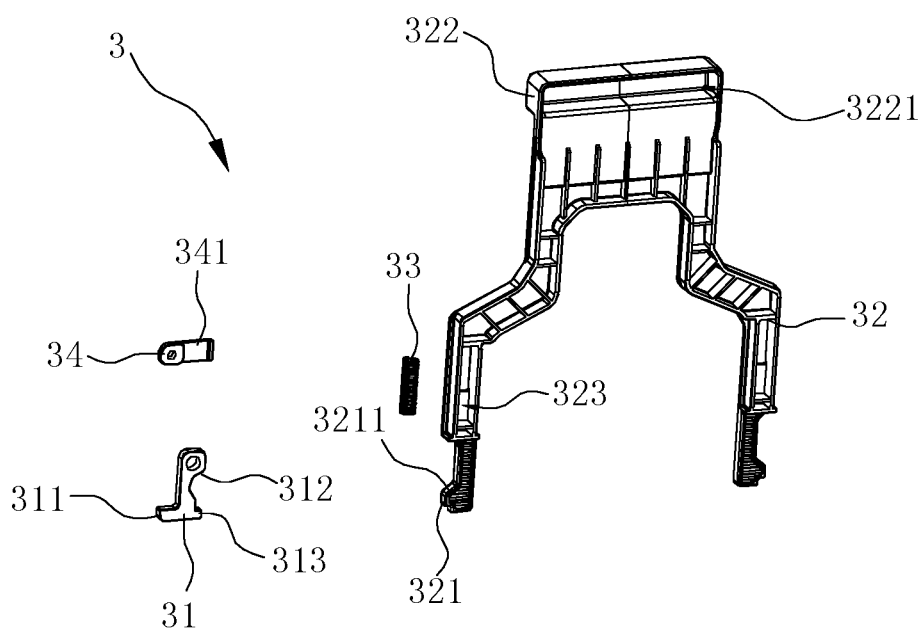
FIG. 6 is a perspective view of the adjustment device of FIG. 4 from another direction.

To enable a further understanding of the present invention content of the invention herein, refer to the detailed description of the invention and the accompanying drawings below:

FIGS. 1-9 show a preferred embodiment of headrest height adjustment mechanism for child safety seats according to the present invention. The headrest height adjustment mechanism comprises a backrest 1, a headrest 2, and an adjustment device 3 for adjusting height of the headrest 2.

A first mounting groove 11 is formed on the backrest 1, and the headrest 2 is engaged to the first mounting groove 11 and is capable of sliding up and down in the first amounting groove 1. The headrest 2 comprises a front shell 2a and a rear shell 2b, which are fitted with and connected to each other. A mounting chamber 21, in which the adjustment device 3 is mounted, is formed when the front shell 2a and the rear shell 2b are assembled together. Furthermore, a guide rib 12, which runs in the height direction, is provided on the sidewall of the first mounting groove 11, and correspondingly, a guide groove 22, which is guide-fitted with the guide rib 12, is formed on the sidewall of the headrest 2. Thus, it is convenient for the user to quickly insert the headrest 2 in the first mounting groove 11 on the backrest 1 and control the adjustment of height of the headrest 2 in the first mounting groove 11.

In this embodiment, the adjustment device 3 comprises a limiting block 31, an adjustment bar 32, a spring 33 and a securing member 34, wherein the limiting block 31 is rotatably connected in the mounting chamber 21 by a pin shaft 35 and has a blocking portion 311, a jack 221 through which the blocking portion 311 passes is formed on a sidewall of the headrest 2 in the guide groove 22, and multiple slots 121 into which the blocking portion 311 is inserted are formed on the backrest 1 in the height direction on the sidewall of the guide rib 12; the adjustment bar 32 is capable of sliding up and down in the mounting chamber 21 and has an driving portion 321 used for rotating the limiting block 31; the spring 33 is arranged between the adjustment bar 32 and the headrest 2 and enables the adjustment bar 32 to have a trend to slide downward; and the securing member 34 is connected to the headrest 2 inside the mounting chamber 21, and the securing member 34 has a sliding groove 341 for positioning the adjustment bar 32 which only can slide along the sliding groove 341. The adjustment bar 32 drives, due to the elasticity of the spring 33, the blocking portion 311 of the limiting block 31 by the driving portion 321 to pass through the jack 221 is inserted into a slot 121 on the backrest 1 so that the blocking portion 311 is locked, and the adjustment bar 32 can slide upward, due to an external force and against the elasticity of the spring 33, and drive the blocking portion 311 of the limiting block 31 by the driving portion 321 to separate from the slot 121 on the backrest 1 so that the blocking portion 311 is unlocked. The arrangement of the adjustment bar 32 can be convenient for the user to drive the limiting block 31, the arrangement of the spring 33 can ensure the return of the adjustment bar 32, and the arrangement of the securing member 34 can avoid the separation of the adjustment bar 32, in which case it is unable to drive the limiting block 31.

To be convenient for the adjustment bar 32 to drive the limiting block 31 to rotate, the limiting block 31 has a first guide slope extending outwardly, the driving portion 321 has a second guide slope 3211 extending outward from top to bottom, and the first guide slope 312 is resisted against the second guide slope 3211 when the blocking portion 311 is unlocked. A stopper 313 is convexly formed on a sidewall of the limiting block 31, and the stopper 313 is resisted against the driving portion 321 when the blocking portion 311 is locked. Therefore, the first guide slope 312 of the driving portion 321 gradually gets close to the second guide slope 3211 of the limiting block 31 when the adjustment bar 32 slides upward, thereby driving the limiting block 31 to rotate until the first guide slope 312 is resisted against the second guide slope 3211. The driving portion 321 gradually gets close to the stopper 313 of the limiting block 31 when the adjustment bar 32 slides downward, thereby driving the limiting block 31 to rotate until the blocking portion 311 is inserted in a slot 121.

In this embodiment, the spring 33 is a compression spring, the adjustment bar 32 has a second mounting groove 323 for receiving the spring 33, a limiting column 211 that protruding into the second mounting groove 323 is formed on a bottom surface of the mounting chamber 21, one end of the spring 33 is resisted against the wall of the second mounting groove 323 and the other end of the spring 33 is resisted against the limiting column 211. Of course, the spring may be a tension spring. One end of the tension spring is hung onto a top surface of the second mounting groove 323 and the other end of the tension spring is hung onto the limiting column 211. Such a solution realizes the same purpose.

To be convenient for the user to operate the adjustment bar 32, an operating portion 322 exposed out of the surface of the headrest 2 is disposed on the top of the adjustment bar 32. The operating portion 322 has an operating groove 3221 for the fingers of a user to insert. A gripping portion 23 is disposed on the top of the headrest 2, and the gripping portion 23 has a moving groove 231 in which the operating portion 322 slides up and down. With such an arrangement, by a single hand, the operating portion 322 can be driven to move upward in the moving groove 231 and the headrest 2 can be driven to wholly move upward or downward.

In this embodiment, a guide hole 13 is formed on the backrest 1 along the height direction, and correspondingly, a guide member 4, which can be inserted in the guide hole 13, is connected to the bottom of the headrest 2. The guide-fitting between the guide member 4 and the guide hole 13 plays a role of limiting similarly to the guide rib 12 and the guide groove 22, and also prevents the separation of the headrest 2 from the backrest 1 during the upward movement of the headrest 2.

Figure 8:
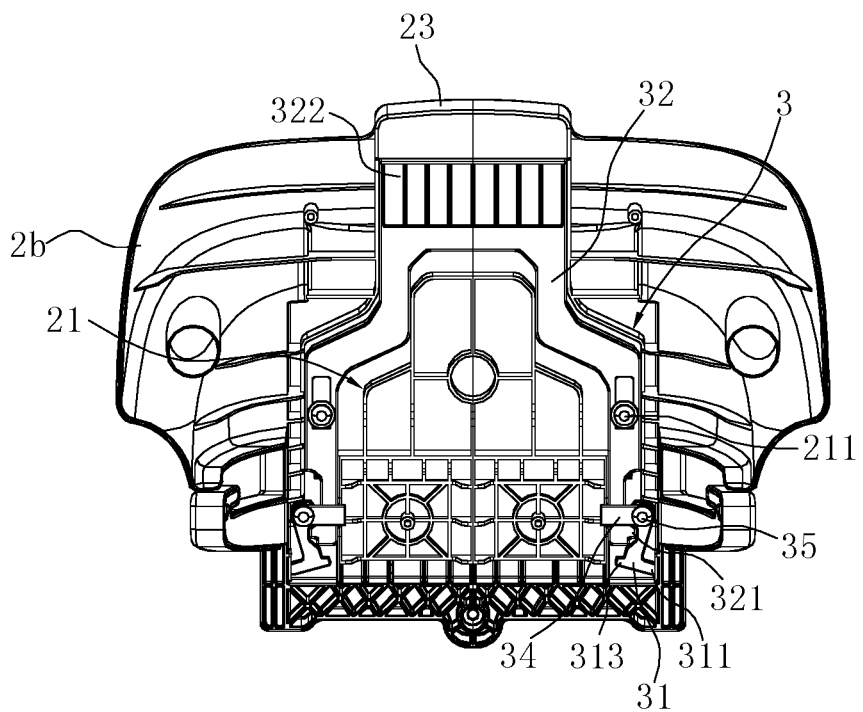
FIG. 8 is a perspective view of FIG. 7, when the blocking portion is unlocked.
Figure 9:
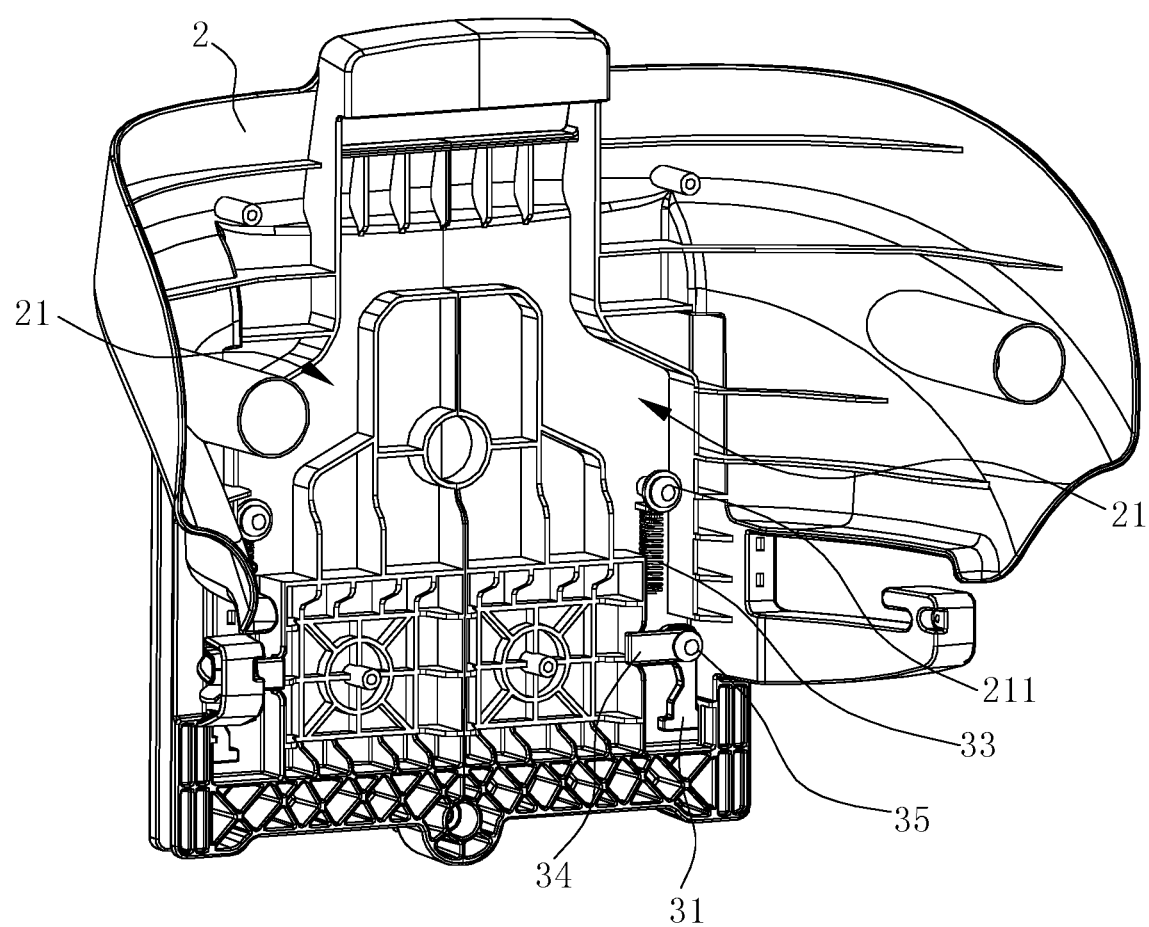
FIG. 9 is another perspective view of FIG. 7, when the adjustment bar is omitted.

The working principle of the present invention is as follows:

(1) When the height of the headrest 2 is to be adjusted, the adjustment bar 32 is pulled upward. The adjustment bar 32 can slide upward due to an external force and against the elasticity of the spring. During this process, the first guide slope 312 of the driving portion 321 gradually gets close to the second guide slope 3211 of the limiting block 31, thereby driving the limiting block 31 to rotate until the first guide slope 312 is resisted against the second guide slope 3211. Then, as shown in FIG. 8, the blocking portion 311 of the limiting block 31 is separated from the slot 121 on the backrest 1 and the blocking portion 311 is unlocked.

(2) Then, the headrest 2 is driven to wholly move upward or downward, until reaching a desired height.

Figure 7:
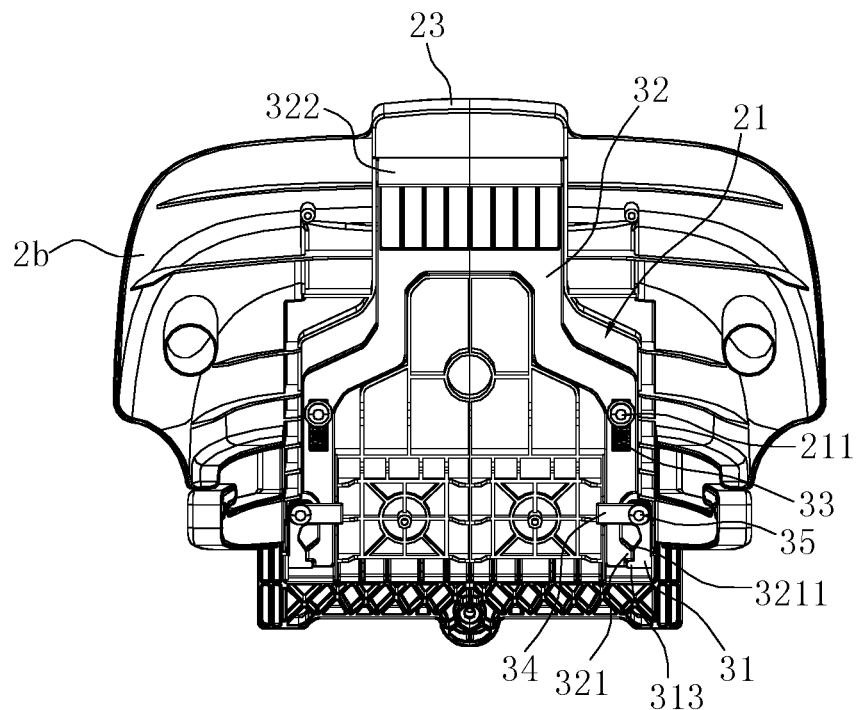
FIG. 7 is an enlarged view of the headrest and the adjustment device of FIG. 4.

(3) Finally, the adjustment bar 32 is released. The adjustment bar 32 can slide downward due to the elasticity of the spring 33. During this process, the driving portion 321 gradually gets close to the stopper 313 of the limiting block 31, thereby driving the limiting block 31 to rotate to the original position. Then, as shown in FIG. 7, the blocking portion 311 passes through the jack 221 is inserted into a slot 121 at a corresponding height of the backrest 1 and the blocking portion 311 is locked.

The invention claimed is:

1. A headrest height adjustment mechanisms for child safety seats, comprising
a backrest with a first mounting groove;
a headrest being engaged to the first mounting groove and being capable of sliding up and down along the first amounting groove; and
an adjustment device for adjusting height of the headrest;
wherein
the headrest has a mounting chamber for receiving the adjustment device;
the adjustment device comprises a limiting block rotatably disposed inside the mounting chamber, a spring, an adjustment bar capable of sliding up and down inside the mounting chamber;
the limiting block has a blocking portion protruding outward;
the headrest has a through hole for the blocking portion to pass through;
multiple slots for receiving the blocking portion are formed on the backrest along a height direction of the backrest;
the adjustment bar has a driving portion for rotating the limiting block;
the spring is disposed between the adjustment bar and the headrest and enables the adjustment bar to have a trend to slide downward;
under the elasticity of the spring, the driving portion of the adjustment bar drives the blocking portion to pass through the through hole and is inserted into one slot on the backrest, when the blocking portion is locked; and,
under an external force, the driving portion of the adjustment bar can slide upward against the elasticity of the spring, and drive the blocking portion to leave away from the slot on the backrest, when the blocking portion is unlocked.

2. The headrest height adjustment mechanisms of claim 1, wherein the limiting block has a first guide slope extending outwardly;
the driving portion has a second guide slope extending outward from top to bottom, and the first guide slope is resisted against the second guide slope when the blocking portion is unlocked.

3. The headrest height adjustment mechanisms of claim 1, wherein the limiting block has a stopper protruding opposite to the blocking portion, and the stopper resists against the driving portion when the blocking portion is locked.

4. The headrest height adjustment mechanisms of claim 1, wherein the adjustment device further comprises a securing member connected to the headrest inside the mounting chamber, and the securing member has a sliding groove for positioning the adjustment bar which only can slide along the sliding groove.

5. The headrest height adjustment mechanisms of claim 1, wherein
the spring is a compression spring;
the adjustment bar has a second mounting groove for receiving the spring;
a limiting column that protruding into the second mounting groove is formed on a bottom surface of the mounting chamber;
one end of the spring is resisted against the wall of the second mounting groove and the other end of the spring is resisted against the limiting column.

6. The headrest height adjustment mechanisms of claim 1, wherein an operating portion exposed out of the surface of the headrest is disposed on the top of the adjustment bar.

7. The headrest height adjustment mechanisms of claim 6, wherein a gripping portion is disposed on the top of the headrest, and the gripping portion has a moving groove in which the operating portion slides up and down.

8. The headrest height adjustment mechanisms of claim 7, wherein the operating portion has an operating groove for the fingers of a user to insert.

9. The headrest height adjustment mechanisms of claim 1, wherein a guide rib arranged along the height direction is disposed on the sidewall of the first mounting groove, and correspondingly, a guide groove, which is guided by the guide rib, is formed on the sidewall of the headrest.

10. The headrest height adjustment mechanisms of claim 1, wherein a guide hole is formed on the backrest along the height direction, and correspondingly, a guide member, which can be inserted in the guide hole, is connected to the bottom of the headrest.

* * * * *